Figure 1:
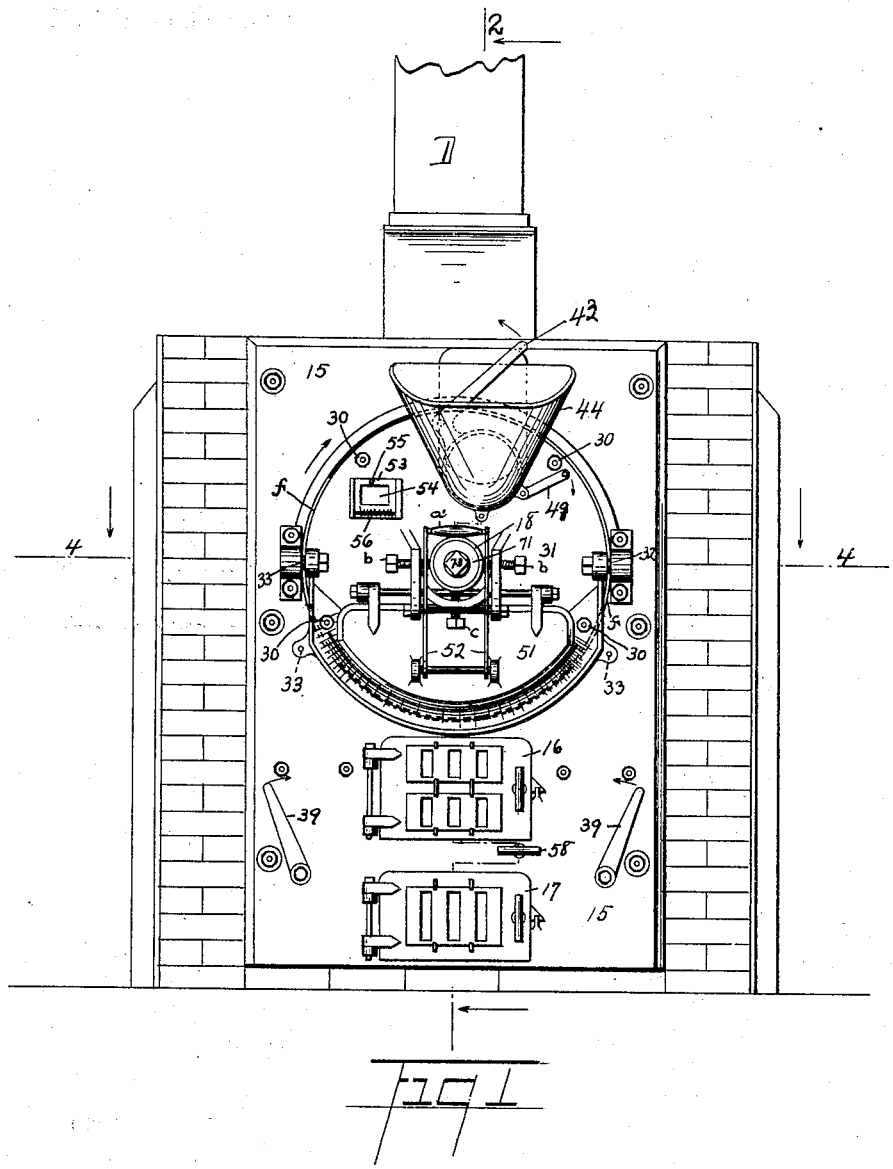

No. 782,770. PATENTED FEB. 14, 1905.
D. J. WARNER & R. H. MATHEWSON.
COFFEE ROASTER AND MIXER.
APPLICATION FILED DEC. 13, 1902.

7 SHEETS—SHEET 1.

WITNESSES:

INVENTORS:
David Jenkins Warner and
Richard Hazard Mathewson.
by Oscar A. Michel atty

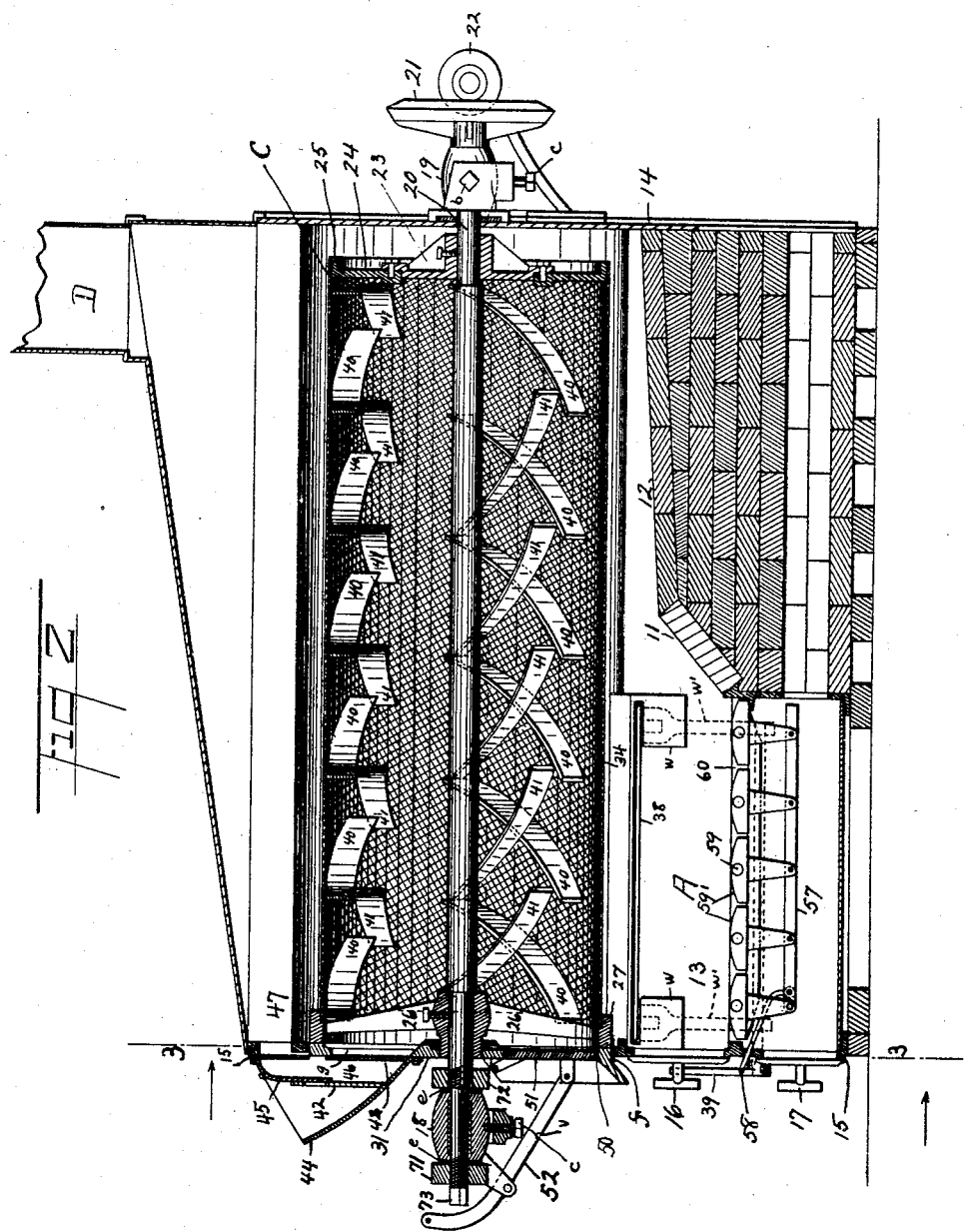

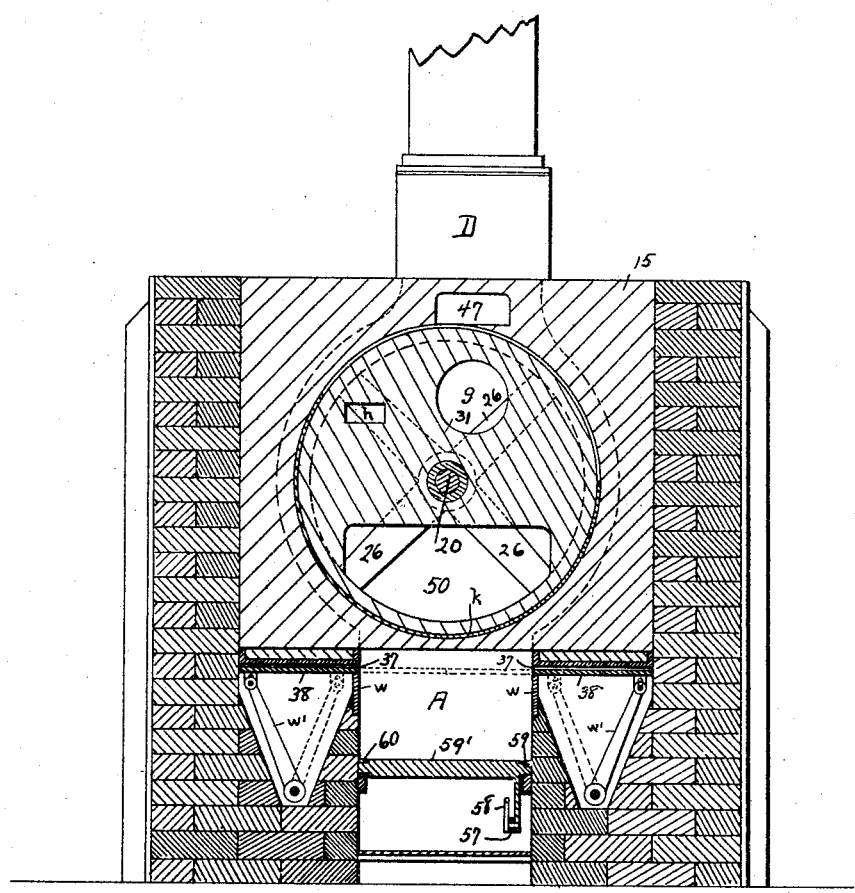

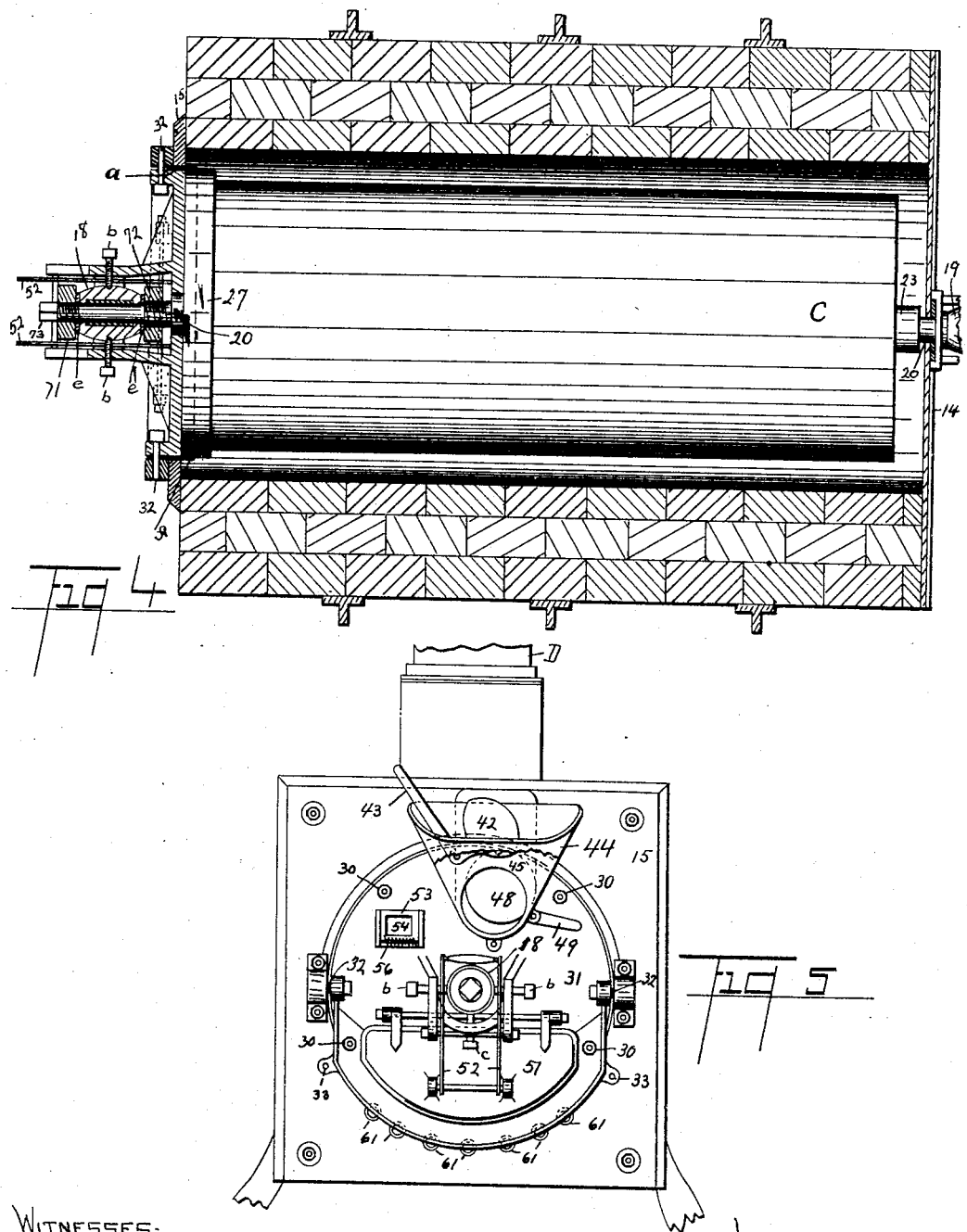

No. 782,770. PATENTED FEB. 14, 1905.
D. J. WARNER & R. H. MATHEWSON.
COFFEE ROASTER AND MIXER.
APPLICATION FILED DEC. 13, 1902
7 SHEETS—SHEET 5.
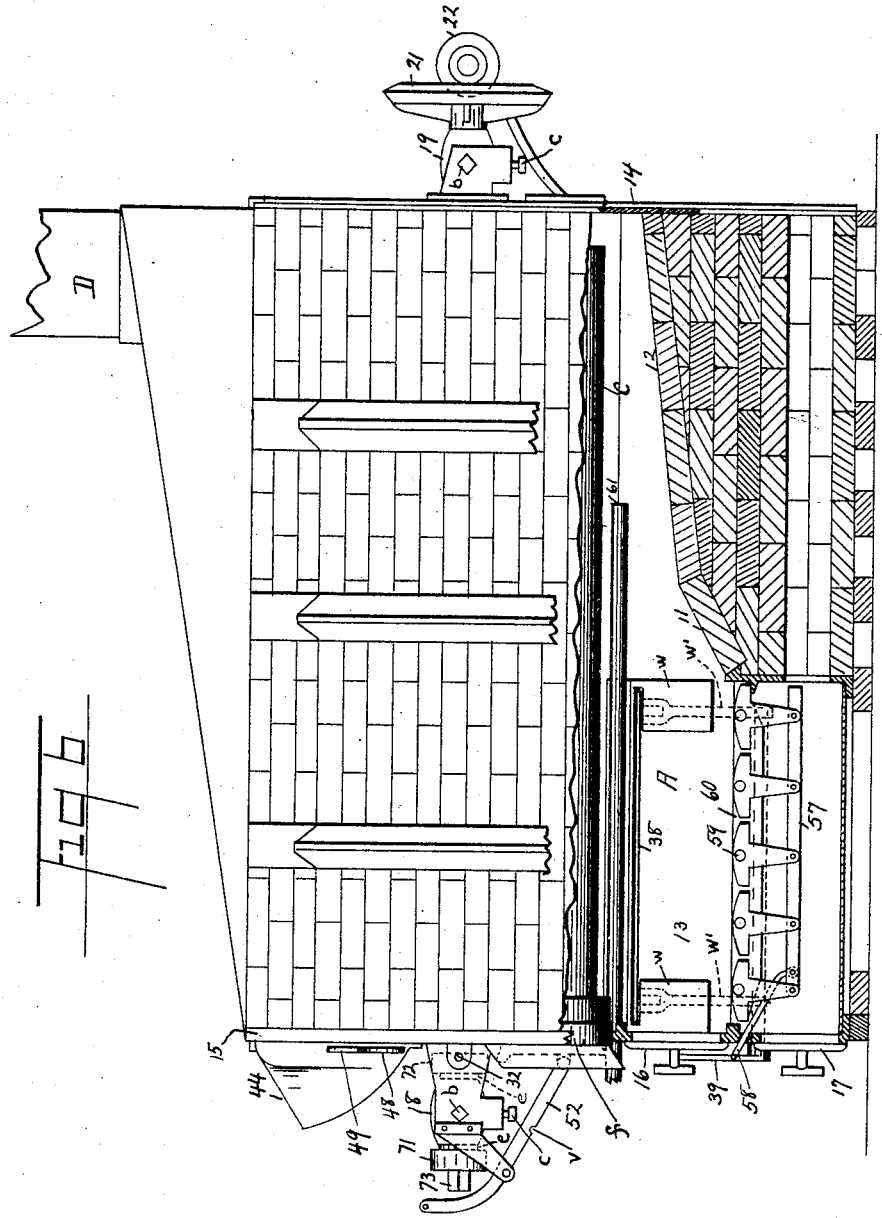
WITNESSES:
Herman Nieter
Wm. J. Martin
INVENTORS:
David Jenkins Warner AND
Richard Hazard Mathewson.
by Oscar A. Michel.

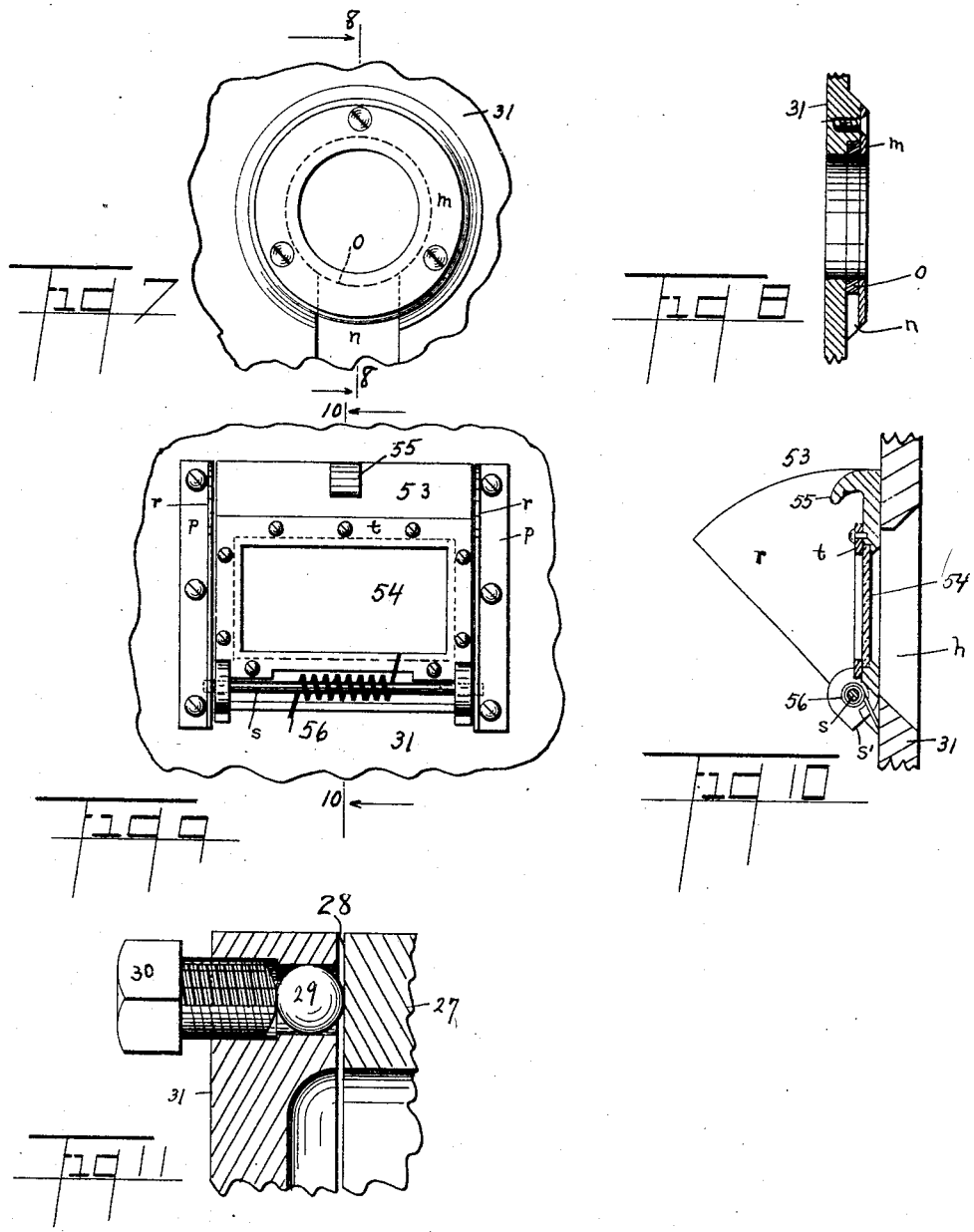

No. 782,770. PATENTED FEB. 14, 1905.
D. J. WARNER & R. H. MATHEWSON.
COFFEE ROASTER AND MIXER.
APPLICATION FILED DEC. 13, 1902
7 SHEETS—SHEET 7.
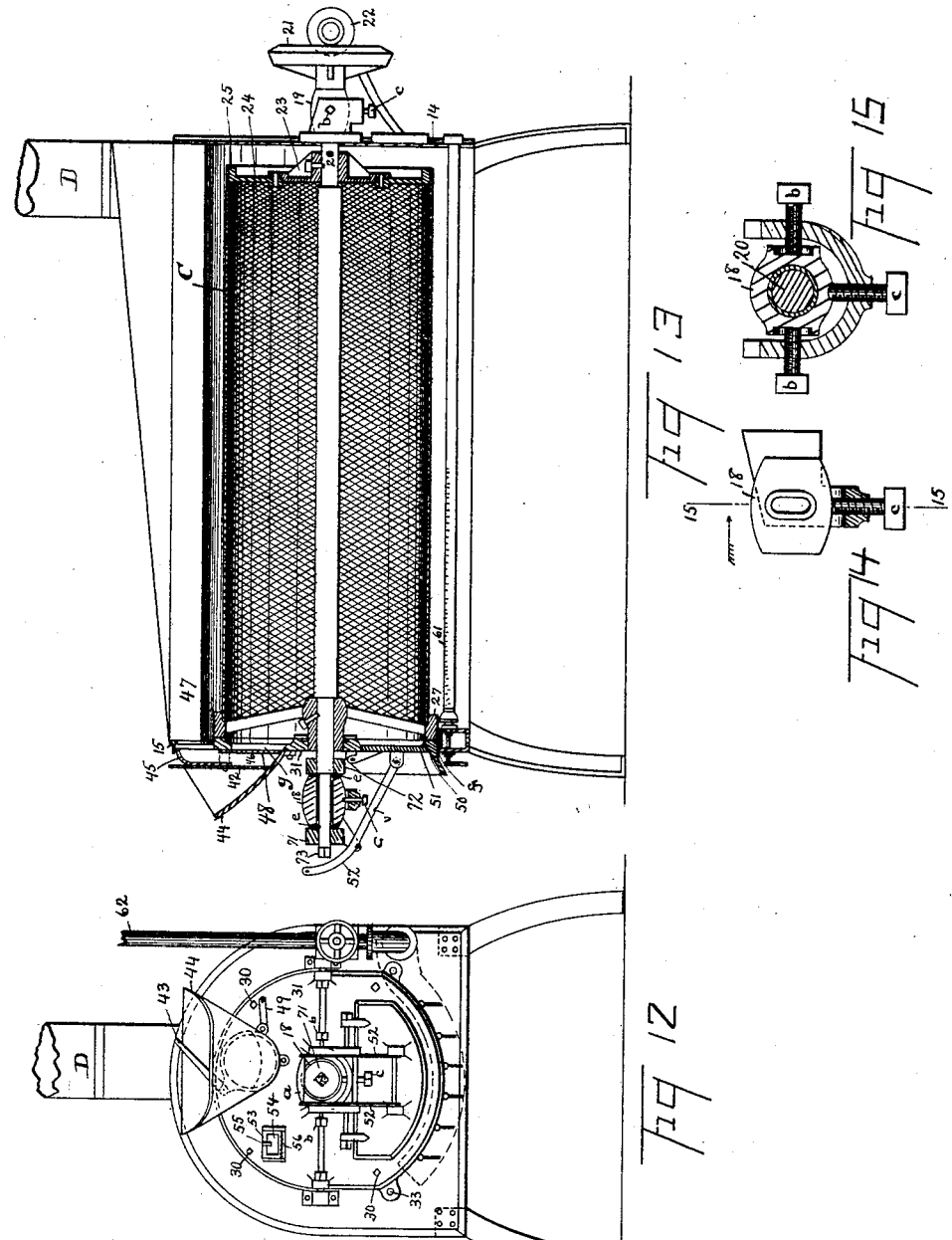
WITNESSES
A. Piehl
William J. Martin
INVENTORS
David Jenkins Warner,
and Richard Hazard Mathewson,
by Oscar A. Michel,
ATTY.

No. 782,770. Patented February 14, 1905.

UNITED STATES PATENT OFFICE.

DAVID JENKINS WARNER, OF BROOKLYN, NEW YORK, AND RICHARD HAZARD MATHEWSON, OF NEW YORK, N. Y., ASSIGNORS, BY MESNE ASSIGNMENTS, TO SAID WARNER.

COFFEE ROASTER AND MIXER.

SPECIFICATION forming part of Letters Patent No. 782,770, dated February 14, 1905.

Application filed December 13, 1902. Serial No. 135,099.

*To all whom it may concern:*

Be it known that we, DAVID JENKINS WARNER, residing in the borough of Brooklyn, and RICHARD HAZARD MATHEWSON, residing in the borough of Manhattan, city, county, and State of New York, citizens of the United States, have invented certain new and useful Improvements in Coffee Roasters and Mixers, of which the following is a specification.

The object of our invention is to provide a roaster for various food products, but which is more particularly intended for use in roasting coffee, cocoa, &c., our improvements comprising a roaster of a simple and cheap form of construction so made that the products treated therein may be inspected from time to time and tested with ease, in which the material being treated will be kept in constant agitation and caused to travel back and forth in the roasting-chamber during the process of roasting, in which upon the stoppage of the device by accident or intent a screen may be interposed between the furnace and the roasting-chamber, and in which the rotating roasting-chamber may be adjusted so as to be at all times in proper alinement despite the natural distortion thereof caused by the extremes of temperature to which it is subjected.

To such ends our invention consists in substance of a furnace; a horizontal roasting-drum, sometimes with a perforate and sometimes with an imperforate wall, open at one end and closed at the other, said drum being revolubly mounted above the furnace; a flue for the escape of the furnace-gases; means for directing the heat of the furnace up, around, along, over, and back underneath the drum to the flue; means for interposing an imperforate screen between the furnace fire and the drum; a grate with rocking or dumping grate-bars located in the furnace; means for rocking and dumping the grate-bars from the exterior of the furnace; a main face-plate for the furnace; an auxiliary face-plate pivoted to the main face-plate and adjacent to the open end of the roasting-drum; means for forcing one side of the pivoted auxiliary face-plate away from the main face-plate; antifriction devices interposed between the auxiliary face-plate and the end of the drum; means for adjusting such antifriction devices; a two-chambered feed-hopper, the inner closed chamber of which is in free communication at its upper end with the escape-flue; a sliding or pivoted door in the inner wall of the hopper in registry with the open end of the roasting-drum; a like door in the center wall of the hopper; a discharge-chute orifice in registry with the open end of the drum at the lower side thereof; a door closing the discharge-orifice; a try-hole window formed in the auxiliary face-plate near the top; a transparent cover pivoted at the bottom to the plate closing the window; a spring for keeping the try-hole window normally closed; a central shaft revolubly mounted in suitable bearings rigidly secured to the roasting-drum and extending through the longitudinal axis of said drum; means for leveling the shaft; means for preventing access of material to the bearing-surface of the shaft; means for longitudinally adjusting such shaft; means for causing the rotation of the shaft; a plurality of screw conveyer-blades arranged in a plurality of series along the peripheral wall of the roasting-chamber extending inward toward the center thereof and adapted upon the rotation of the drum to convey the material to be roasted toward one end of the drum, and a like number of blades extending inward from the first-mentioned blades and adapted to convey the material in the opposite direction.

It is not to be understood that our invention is limited to a device necessarily comprising at once all the devices and parts above set forth, as it comprises the particular arrangement of certain devices and parts and the particular construction, combination, and arrangement of certain devices and parts, all as hereinafter more particularly set forth in the specification and pointed out in the claims.

Our invention is fully shown and described in the following specification, of which the accompanying drawings form a part, wherein similar letters or numerals of reference indicate like or equivalent parts wherever found throughout the several views, and in which—

Figure 1 is a front elevation of a coffee, cocoa, or similar food-product roaster or mixer embodying our improvement. Fig. 2 is a side view, looking to the left, in vertical section on the line 2 2 of Fig. 1. Fig. 3 is a front view in section on the line 3 3 of Fig. 2. Fig. 4 is a top view taken in horizontal section on the line 4 4 of Fig. 1. Fig. 5 is a front view showing a modified form of construction in which the furnace is arranged to burn gas or liquid fuel instead of coal or solid fuel, as in the form shown in Figs. 1 to 4, inclusive. Fig. 6 is a vertical section showing a modified form of construction in which both the furnace and gas burners are incorporated. Fig. 7 is an end elevation of the inner side of the auxiliary face-plate, illustrating the washer and washer-plate surrounding the drum-shaft. Fig. 8 is a side view of that part of the device shown in Fig. 7, taken in central vertical section on the line 8 8 of Fig. 7. Fig. 9 is an enlarged view in detail of the try-hole window looking from the front. Fig. 10 is a side view thereof in vertical section on the line 10 10 of Fig. 9 looking from the right. Fig. 11 is an enlarged detail view, in vertical section, of one of the balls and adjusting-screws in position forming the end bearing of the drum. Fig. 12 is a front view of a modified form of construction wherein the heating is done by gas instead of by a solid-fuel furnace. Fig. 13 is a side view of a construction shown in Fig. 12, in central vertical longitudinal section. Fig. 14 is an enlarged side elevation view of the end bearing of the drum-shaft, showing the bracket in section; and Fig. 15 is a vertical section on the line 15 15 of Fig. 14.

Referring to the drawings, the reference-letter A indicates the furnace, which may be of any desired form, but is usually of brick, as shown, having the bridge-wall 11 and the slope 12, formed of refractory fire-brick, in order to deflect upwardly the flames and heat from the fire-box 13. The furnace A is closed at the rear by a back plate 14 and at the front by a main face-plate 15, which latter is provided with the fire-door 16 and ash-pit door 17. Secured to said main face-plate 15 in any desired manner, but usually in the self-balancing manner shown in Figs. 1 and 2, is a journal box or bearing 18, and secured in like manner to the back plate 14 is a like box or bearing 19, a main shaft 20 being revolubly mounted in said bearings and a gear-wheel 21 being secured to the rear end of said shaft, said gear-wheel meshing with a like wheel 22, that is connected with suitable driving power.

Rigidly secured upon the rear end of the main shaft 20 is a central boss-plate 23, to the periphery of which is bolted an annular plate 24, which is provided at its periphery with the backwardly-turned flange 25, and also rigidly secured upon the shaft 20, adjacent to its forward end, is a spider 26, that is provided with a peripheral flange 27, the outer edge 28 of such flange 27 serving as a bearing against which antifriction-balls 29 are pressed by screws 30, said screws being carried by an auxiliary face-plate 31, which is pivoted to the main face-plate 15 upon the pivots 32, the lower side of said plate 31 being held normally pressed away from the main face-plate 15 by the spring 33. By the said arrangement it will be seen that all wear or disarrangement, whether from heat, distortion, or any cause whatsoever, can be quickly and easily taken up through proper adjustment of the screws 30, whereby the shaft may run true at all times and the joint will be kept free of dirt. The main shaft 20 where it passes through the plate 31 has its joint rendered tight by means of a suitable washer $o$, held in place by a metallic washer-ring $m$, as shown in detail in Figs. 7 and 8, and the annular cavity containing the washer is provided with a bottom slot $n$, extending through the lower side of the washer-boss, so that dust getting in the hole may quickly work down and out.

Secured at one end to the spider 26 and at the opposite end to the flange 25 of the annular plate 24 is the drum-casing 34, forming the peripheral wall of the roasting-drum C. Said drum-wall may be either perforate, being formed of perforated metal or woven wire, as in the construction shown in Fig. 2, when the machine is desired to be used for the roasting of coffee or the popping of corn, &c., or the drum-wall may be imperforate when it is desired to use the device for the roasting of cocoa, &c.

To prevent any foreign matter from coming in contact with the under side of the drum C, we have placed a band or guard $f$ underneath said drum and extending each side of the face-plate 15, as clearly shown in Fig. 2.

Arranged on each side of the furnace A and just below the drum C are secured plates $w$, having suitable ways 37, through which baffle-plates 38 slide easily back and forth, which baffle-plates are actuated from the furnace front by means of the levers 39, but are normally situated at the side, so as to give the furnace heat free access to the cylinder or drum. Upon throwing the levers 39 (which are connected by levers $w'$ to the baffle-plates) to the position shown in dotted lines in Fig. 3 this action will cause the baffle-plates to be thrown to the center, so as to be interposed between the furnace-fire and the drum, whereby said drum will be screened from the direct heat of the fire, and thus prevent the burning to destruction of the food products being roasted upon the stoppage of the machine through breakage, sudden stoppage of power, &c.

Rigidly secured within the roasting-drum C are a plurality of blades 40, facing to the right, and also rigidly secured within such drum to said blades 40 is a series of similar blades 41, different from the first only in that they are oppositely faced—that is, upon rotation of the drum the blades 40 will force that portion of the food product in contact therewith toward one end of the drum, while the blades 41 will force such portion of the product as is in contact therewith toward the opposite end of the drum. By this arrangement it will be seen that as the drum is rotated the product is thoroughly mixed and mingled and caused to travel from end to end of the drum over and over again, whereby burning thereof is prevented and a thorough mixing thereof brought about.

Formed in the auxiliary face-plate 31 near the top is a feed-orifice $g$, closed by a pivoted door 48, that is manipulated by a hand-lever 49, and covering this door and orifice and firmly bolted to the auxiliary face-plate is a feed-hopper 44, provided with the central partition 45, the top of which is firmly bolted to the main face-plate, whereby the inner chamber 46 of the hopper formed by such partition is in free communication at the top with the escape-flue 47, leading to the chimney D. A feed-orifice in the lower part of the partition 45 is closed by a pivoted door 42, similar to the door 48, which door is manipulated in like manner by a hand-lever 43, similar to the lever 49.

Formed in and through the auxiliary face-plate 31 at the lower side, with an outwardly and downwardly flaring flange surrounding the same, is a discharge-orifice 50, which is normally closed by the door 51, hinged at the top to the auxiliary face-plate and provided with the actuating and self-locking lever 52, having on the under side thereof openings $v$, by which the same may be locked either in the open or closed position, the door being locked in the open position during the discharging process and the finished product being delivered through the discharge-orifice by the action of the blades as the rotation of the drum is continued.

Formed in and through the auxiliary face-plate 31 at one side, adjacent to the top thereof, is a try-hole window or orifice $h$, usually of the shape shown in detail in Figs. 9 and 10. This orifice is closed by a door 53, provided with a hand-hook 55, carrying a glass or other transparent plate 54, held in place by the frame $t$, said door being pivoted at the bottom to a plate $p$, secured to the auxiliary face-plate 31 and having extended side portions $r$. Said door is held normally closed by a spring 56, secured to the hinge, rod, or pivot $s$, one end of said spring bearing against the door and the other end resting against the face-plate 31, as fully shown in Fig. 9. The ends of said rod $s$ are secured in the side portions $r$ of the plate $p$ and pass through hinge-pieces secured to the door, so shaped, as shown at $s'$ in Fig. 10, that by abutment against the plate 31 they prevent the door from being swung outwardly beyond the side portions $r$. By this arrangement it will be seen that when the door is opened the rotation of the drum will cause some of the products to be thrown out upon the glass, whence they may be taken by the hand and tested, and also whereby the glass will at all times permit an unobstructed view of the interior of the drum, enabling the operator to instantly detect with the eye any symptoms of overroasting or burning of the product.

In the form of improved furnace shown in Figs. 1 and 2, when adapted for use with coal or solid fuel, the same is provided with our improved form of rocking or dumping grate-bars of the form shown in Fig. 2, which are connected together at the bottom by a connecting-rod 57, moved by a hand-lever 58, whereby the grate-bars upon the pulling in and out of the lever 58 will be each simultaneously rocked upon their end pivots 59, by which they are supported in suitable supporting side bars 60, secured within the furnace.

It will be seen upon examination of Fig. 2 that a suitable fire having been built in the furnace A and the drum C set into rotation if now the hopper 44 be filled with products to be roasted and the hopper-doors opened said products will be fed into the drum and that this feeding may be made fast or slow, as may be desired; also, that if the drum-wall be imperforate, as in the form of construction shown in Fig. 4, used more especially in the roasting of cocoa, the inner hopper-door 48 may be left permanently open in order to allow the gases generated by the roasting to escape by way of the inner hopper-orifice into the escape-flue 47.

In the preferred construction of our device (shown in Figs. 1 and 2) the journal-bearings 18 and 19 at each end of the shaft are pivotally supported in suitable supports secured to the plates 31 and 14 by bolts $b$ and also by bottom bolts $c$ for raising and lowering such journal-bearings, and the front journal when the parts are in position is interposed between screw-nuts 71 and 72, each faced with a suitable washer $e$, and the end of the main shaft 20 is provided with a square or hexagonal head 73 to receive a wrench to prevent rotation thereof during the manipulation of the nuts; also, in case of any breakage of the machine that the operator can manipulate the drum, open the discharge-door, and allow the discharge of the roasted products, so as to save such material.

The construction shown in Figs. 5 and 12 differs from that heretofore described only in the fact that burners 61 are provided in place of the grate shown in Fig. 2 for furnishing the required quantity of heat, which burners are supplied with gas or any suitable fluid fuel through a supply-pipe 62, and in this case, inasmuch as the heat can be easily and instantly regulated, the baffle-plates 36 may be omitted.

The construction shown in Fig. 6 is for the purpose of using both fluid and solid fuel in the same machine, so that in case of any breakdown in either form of heat the machine can be made to run without any delay with the other means.

It is evident that without starting the furnace the device may be used as a mixer, and we do not intend to limit ourselves to the use of our invention as a roaster, as many other uses may be found for the same.

Having now described our invention, we declare that what we claim is—

1. In a device of the class described, a revolubly-mounted horizontal drum closed at one end and open at the other, means for heating the periphery of the drum as the same is rotated, means for feeding the material to be roasted into the open end of the drum, means for removing the roasted products from the lower side of the open end of the drum, and opposed, horizontally-movable baffle-plates adapted through actuation by pivotal levers to be interposed between the heat of the furnace and the adjacent surface of the drum.

2. In a device of the class described, a revolubly-mounted horizontal drum closed at one end and open at the other, means for heating the periphery of the drum as the same is rotated, means for feeding the material to be roasted into the upper part of the open end of the drum, means for removing the roasted products from the lower part of the open end of the drum, means located within the drum for agitating the material as the drum is rotated, and opposed, horizontally-movable baffle-plates adapted through actuation by pivotal levers to be interposed between the heat of the furnace and the adjacent surface of the drum.

3. In a device of the class described, a revolubly-mounted horizontal drum closed at one end and open at the other end, means for heating the periphery of the drum as the same is rotated, means for feeding the material to be roasted into the upper part of the open end of the drum, means for removing the roasted products from the lower part of the open end of the drum, means for causing a circulation of the material from the front to the rear of the drum as the same is rotated, and opposed, horizontally-movable baffle-plates adapted through actuation by pivotal levers to be interposed between the heat of the furnace and the adjacent surface of the drum.

4. In a device of the class described, a furnace, a roasting-drum rotatable upon a horizontal shaft mounted in a chamber above the furnace, said drum being closed at one end and open at the other end, an exhaust-flue above the drum in communication with the furnace-chamber past the open end of said drum, means for directing the furnace-gases toward and around the closed end of the drum, means for feeding the material to be roasted into the open end of the drum at its upper portion, means at the lower portion of the same end of the drum for removing the roasted products, and opposed, horizontally-movable baffle-plates adapted through actuation by pivotal levers to be interposed between the heat of the furnace and the adjacent surface of the drum.

5. In a device of the class described, a furnace, a roasting-drum rotatable upon a horizontal shaft mounted in a chamber above the furnace, said drum being closed at one end and open at the other end, an exhaust-flue above the drum in communication with the furnace-chamber past the open end thereof, means for directing the furnace-gases toward and around the closed end of the drum, means for feeding the material to be roasted into the open end of the drum at its upper portion, means at the lower portion of the same end of said drum for removing the roasted products, means within the drum for causing a constant circulation of the material as the drum is rotated, and opposed, horizontally-movable baffle-plates adapted through actuation by pivotal levers to be interposed between the heat of the furnace and the adjacent surface of the drum.

6. In a device of the character described, a furnace-chamber, a drum revolubly mounted upon a horizontal shaft, a plurality of vanes or blades obliquely arranged against the peripheral wall of said drum on its inner side to direct the material toward one end of the drum, and similar vanes or blades intersecting the first-mentioned vanes or blades in a different plane and obliquely arranged to direct the material in the opposite direction; together with means closing said drum at one end, and said drum at its other end being provided with a spider having a peripheral flange, a main face-plate closing the front of the furnished chamber, an auxiliary face-plate for the drum pivoted to said main face-plate, and antifriction devices interposed between the auxiliary face-plate and the outer edge of the peripheral flange of the spider.

7. In a device of the character described, a furnished chamber, a revoluble drum having a foraminous peripheral wall, a plurality of vanes or blades obliquely arranged against the peripheral wall of said drum on its inner side to direct the material toward one end of the drum, and similar vanes or blades intersecting the first-mentioned vanes or blades in a different plane and obliquely arranged to direct the material in the opposite direction; together with means closing said drum at one end, and said drum at its other end being provided with a spider having a peripheral flange, a main face-plate closing the front of the furnace-chamber, an auxiliary face-plate for the drum pivoted to said main face-plate, and antifriction devices interposed between the auxiliary face-plate and the outer edge of the peripheral flange of the spider.

8. In a device of the character described, a furnace-chamber, a drum revolubly mounted upon a horizontal shaft, said drum being closed at one end and provided at the other end with a spider having a peripheral flange, a main face-plate closing the front of the furnace-chamber, an auxiliary face-plate for the drum pivoted to said main face-plate, and antifriction devices interposed between the auxiliary face-plate and the outer edge of the peripheral flange of the spider.

9. In a device of the character described, a furnace-chamber, a drum revolubly mounted upon a horizontal shaft, said drum being closed at one end and provided at the other end with a spider having a peripheral flange, a main face-plate closing the front of the furnace-chamber, an auxiliary face-plate for the drum pivoted to said main face-plate, antifriction devices interposed between the auxiliary face-plate and the outer face of the peripheral flange of the spider, and means for adjusting the antifriction devices.

10. In a device of the class described, a furnace-chamber, a drum revolubly mounted upon a horizontal shaft, said drum being closed at one end and provided at the other end with a spider having a peripheral flange, an auxiliary face-plate pivoted to the front wall of the furnace-chamber, spring means normally holding such pivoted plate in one position, antifriction devices interposed between the pivoted face-plate and the peripheral flange of the drum, and means for individually adjusting such antifriction devices.

11. In a device of the class described, a furnace-chamber, a drum revolubly mounted upon a horizontal shaft, said drum being closed at one end and provided at the other end with a spider having a peripheral flange, a main face-plate closing the front of the furnace-chamber, an auxiliary face-plate pivoted to said main face-plate, a plurality of recesses formed in said auxiliary face-plate, an antifriction-ball located in each of such recesses, and a screw-bolt for forcing each of said balls toward the spider.

12. In a device of the class described, a furnace-chamber, a drum revolubly mounted upon a horizontal shaft, said drum being closed at one end and provided at the other end with a spider having a peripheral flange, a main face-plate closing the front of the furnace-chamber, an auxiliary face-plate pivoted to said main face-plate, a plurality of recesses formed in said auxiliary face-plate, an antifriction-ball located in each of such recesses, a screw-bolt for forcing each ball toward the spider, spring means normally holding such pivoted plate in one position, antifriction devices interposed between said pivoted plate and the peripheral flange of the spider, and means for individually adjusting such antifriction devices.

13. In a device of the character described, a furnace, a horizontal shaft extending above the furnace, a revoluble drum carried by the shaft, a closed chamber located above the furnace surrounding the drum, opposite adjustable bearings located without the furnace-chamber, nuts screwed upon the shaft at both sides of one of the bearings for longitudinally adjusting such shaft, and movable baffle-plates adapted to be interposed between the heat of the furnace and the adjacent surface of the drum.

14. In a device of the class described, a furnace, an inclosed chamber above the furnace, an exhaust-flue for such chamber, a drum revolubly mounted upon a horizontal shaft located in the chamber above the furnace, said drum being open at one end and closed at the other end, a feed-hopper in communication with the open end of the drum near the top thereof, a sliding door or gate for closing the communicating orifice between the hopper and the drum, an inner hopper-chamber adjacent to the feed-passage in communication at the top with the exhaust-flue and with the furnace-chamber, a passage forming a communication between the outer and inner chamber of the hopper, and a door for closing such passage.

15. In a device of the character described, a furnace, an inclosed chamber above the furnace, a main face-plate, an auxiliary face-plate pivoted thereto, a feed-hopper carried by said auxiliary face-plate, a partition dividing said hopper into inner and outer compartments, an exhaust-flue for said inclosed chamber in communication at the front end thereof by way of the inner chamber of the partition-hopper, an orifice in said auxiliary face-plate in communication with the drum, an orifice in the partition of the hopper, and a pivoted door to close said orifice in the partition.

16. In a device of the class described, a furnace, an inclosed chamber above the furnace, an exhaust-flue for such chamber, a drum having a foraminous peripheral wall revolubly mounted upon a horizontal shaft, and located in the chamber above the furnace, said drum being open at one end and closed at the other end, a feed-hopper having an orifice communicating with the open end of the drum near the top thereof, a pivoted door or gate to close said orifice, a partition dividing said hopper into inner and outer compartments, the inner compartment communicating at its top with the exhaust-flue and with the furnace-chamber, a passage between the outer and the inner chambers of the hopper, and a pivoted door for closing such passage.

17. In a device of the class described, a furnace, a heating-chamber above the furnace, a main face-plate, an auxiliary face-plate pivoted thereto, a drum revolubly mounted upon a horizontal shaft and located in the heating-chamber, one end of said drum being open and the other end closed, means within the drum for forcing the material therein in opposite directions as the drum is rotated, a try-hole orifice formed in the auxiliary face-plate, and a pivotal door closing the try-hole.

18. In a device of the class described, a furnace, a heating-chamber above the furnace, a drum having a foraminous peripheral wall revolubly mounted upon a horizontal shaft located in the heating-chamber, one end of said drum being open and the other end closed, means within the drum for forcing the material therein in opposite directions as the drum is rotated, a main face-plate closing the front of the heating-chamber, an auxiliary face-plate pivoted to said main face-plate, a try-hole orifice formed in the auxiliary face-plate, a door closing the try-hole orifice and pivoted at the bottom to the said auxiliary face-plate, said door carrying a transparent pane, and a spring normally keeping the try-hole door closed.

19. In a device of the class described, a furnace, a heating-chamber located above the furnace, a horizontal shaft revolubly mounted in the heating-chamber, a drum carried by the shaft, said drum being closed at one end and open at the other end, a main face-plate closing the end of the heating-chamber, an auxiliary face-plate pivoted to said main face-plate and adjacent to the open end of the drum, a recess formed on the inner side of the auxiliary face-plate surrounding the shaft, a washer or packing material located in the recess, and a washer-plate secured to said auxiliary face-plate to hold the washer in position.

20. In a device of the class described, a furnace, a heating-chamber located above the furnace, a horizontal shaft revolubly mounted in the heating-chamber, a drum carried by the shaft, said drum being closed at one end and open at the other end, a main face-plate closing the end of the heating-chamber, an auxiliary face-plate pivoted to said main face-plate and adjacent to the open end of the drum, a recess formed on the inner side of the face-plate surrounding the shaft, a washer or packing material located in the recess, such recess being provided at its under side with a slot in free communication with the interior of the drum, and a washer-plate secured to the auxiliary face-plate for holding the washer in position.

21. In a device of the class described, a furnace, an inclosed chamber above the furnace, a face-plate closing the front of the furnace and the chamber, a drum revolubly mounted upon a horizontal shaft located in the chamber above the furnace, said drum being open at its front end and closed at its rear end, and a protecting guard-flange secured to the face-plate, said flange extending rearwardly underneath the open end of the drum.

22. In a device of the character described, a furnace-chamber, a woven-wire drum revolubly mounted upon a horizontal shaft, said drum being closed at one end and provided at the other end with a spider having a peripheral flange, a main face-plate closing the front of the furnace-chamber, an auxiliary face-plate pivoted to said main face-plate, and antifriction devices interposed between the auxiliary face-plate and the annular face of the peripheral flange of the spider.

23. In a device of the character described, a furnace, an inclosed chamber above the furnace, a feed-hopper having a partition, forming inner and outer compartments, said hopper being located above the furnace, a drum open at its end adjacent to the feed-hopper and revolubly mounted above the furnace, an exhaust-flue for said chamber in communication at the front end thereof through the inner chamber of the hopper, an orifice in the partition of the hopper, and a pivoted door to close said orifice.

In testimony whereof we have affixed our signatures in the presence of two witnesses.

DAVID JENKINS WARNER.
  RICHARD HAZARD MATHEWSON.

Witnesses:
 Oscar A. Michel,
 Herman Nieter.